(12) United States Patent
Masuda et al.

(10) Patent No.: US 11,098,620 B2
(45) Date of Patent: Aug. 24, 2021

(54) VARIABLE COMPRESSION RATIO MECHANISM

(71) Applicant: IHI CORPORATION, Tokyo (JP)

(72) Inventors: Yutaka Masuda, Tokyo (JP); Jun Teramoto, Tokyo (JP); Ryo Ohara, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/953,477

(22) Filed: Nov. 20, 2020

(65) Prior Publication Data

US 2021/0071550 A1    Mar. 11, 2021

Related U.S. Application Data

(63) Continuation of application No. PCT/JP2019/020817, filed on May 27, 2019.

(30) Foreign Application Priority Data

Jun. 11, 2018 (JP) .............................. JP2018-111422

(51) Int. Cl.
  *F01M 1/06* (2006.01)
  *F02B 75/04* (2006.01)
  *F16J 7/00* (2006.01)
(52) U.S. Cl.
  CPC .............. *F01M 1/06* (2013.01); *F02B 75/04* (2013.01); *F16J 7/00* (2013.01); *F01M 2001/066* (2013.01)

(58) Field of Classification Search
  CPC ...... F01M 1/06; F01M 2001/066; F16C 5/00; F16C 7/06; F02B 75/04; F02B 75/045; F02D 15/00; F02D 15/02; F02D 2700/03; F01B 31/14
  See application file for complete search history.

(56) References Cited

U.S. PATENT DOCUMENTS

| | | | |
|---|---|---|---|
| 8,151,691 B2* | 4/2012 | Pirault | F02B 75/044 |
| | | | 92/181 P |
| 9,677,469 B2* | 6/2017 | Wittek | F02B 75/045 |
| 10,487,754 B1* | 11/2019 | Choi | F02B 75/04 |
| 2007/0175422 A1 | 8/2007 | Takahashi et al. | |
| 2015/0260094 A1 | 9/2015 | Wittek | |
| 2016/0319738 A1* | 11/2016 | Yamada | F02B 75/045 |

(Continued)

FOREIGN PATENT DOCUMENTS

| | | |
|---|---|---|
| EP | 2687707 A2 | 1/2014 |
| EP | 3296539 A1 | 3/2018 |
| JP | 2007-177748 A | 7/2007 |

(Continued)

OTHER PUBLICATIONS

International Search Report issued in Application No. PCT/JP2019/020817 dated Aug. 6, 2019, 4 pages.

*Primary Examiner* — Grant Moubry
(74) *Attorney, Agent, or Firm* — Rothwell, Figg, Ernst & Manbeck, P.C.

(57) ABSTRACT

Provided is a compression ratio varying mechanism, including a communication hole including: a first opening opened in an outer peripheral side surface of a piston rod; and a second opening, which is prevented from being opposed to the first opening in a radial direction of a piston rod, and is connected to an oil passage at a position apart from the first opening in a stroke direction.

8 Claims, 14 Drawing Sheets

(56) References Cited

U.S. PATENT DOCUMENTS

2016/0319739 A1* 11/2016 Yamada ................ F02B 75/045
2017/0248074 A1* 8/2017 Ezaki ........................ F16C 7/06

FOREIGN PATENT DOCUMENTS

| JP | 2007-247415 A | 9/2007 |
| JP | 2012-062796 A | 3/2012 |
| JP | 2014-020375 A | 2/2014 |
| JP | 2017-129089 A | 7/2017 |
| WO | 2016/182004 A1 | 11/2016 |
| WO | 2015/108178 A1 | 3/2017 |
| WO | 2015/108182 A1 | 3/2017 |

* cited by examiner

VARIABLE COMPRESSION RATIO MECHANISM

CROSS REFERENCE TO RELATED APPLICATIONS

This application is a continuation application of International Application No. PCT/JP2019/020817, filed on May 27, 2019, which claims priority to Japanese Patent Application No. 2018-111422, filed on Jun. 11, 2018, the entire contents of which are incorporated by reference herein.

BACKGROUND ART

Technical Field

The present disclosure relates to a compression ratio varying mechanism.

Related Art

In Patent Literature 1, there is disclosed a compression ratio varying mechanism. The compression ratio varying mechanism includes a hydraulic chamber formed between a piston rod and a crosshead pin. A top dead center position of a piston is changed by supplying or discharging working oil to or from the hydraulic chamber.

CITATION LIST

Patent Literature

Patent Literature 1: WO 2015/108182 A1

SUMMARY

Technical Problem

Incidentally, a cooling oil passage extending in a stroke direction of the piston is formed inside the piston rod. Cooling oil for cooling the piston and the piston rod flows through the cooling oil passage. Moreover, the piston rod has a communication hole configured to allow an outside of the piston rod and the cooling oil passage to communicate with each other. The cooling oil is introduced from the outside of the piston rod to the cooling oil passage through the communication hole. Stress is liable to concentrate in the communication hole due to application of combustion pressure.

The present disclosure has an object to provide a compression ratio varying mechanism capable of reducing a stress concentration that occurs in communication holes.

Solution to Problem

In order to solve the above-mentioned problem, according to the present disclosure, there is provided a compression ratio varying mechanism, including: a piston; a piston rod coupled to the piston; an oil passage, which is formed inside the piston rod, and extends in a stroke direction of the piston; and a communication hole including: a first opening opened in an outer peripheral side surface of the piston rod; and a second opening, which is prevented from being opposed to the first opening in a radial direction of the piston rod, and is connected to the oil passage at a position apart from the first opening in the stroke direction.

The compression ratio varying mechanism may further include a pair of seal members, which are arranged on the outer peripheral side surface of the piston rod, and are apart from each other in the stroke direction, and any one of the pair of seal members may be arranged between the first opening and the second opening in the stroke direction.

The compression ratio varying mechanism may further include: a large-diameter portion, which is formed in the piston rod, and has the first opening opened therein; a small-diameter portion, which is formed in the piston rod, and has an outer diameter smaller than an outer diameter of the large-diameter portion; and a curved surface portion, which is formed at a position apart from the second opening in the stroke direction, and connects an outer peripheral surface of the large-diameter portion and an outer peripheral surface of the small-diameter portion to each other.

The communication hole may comprise a plurality of communication holes arranged in a circumferential direction of the piston rod, and at least one of the plurality of first openings may be arranged at a position different in the stroke direction from that of another first opening of the plurality of first openings.

The communication hole may comprise a plurality of communication holes arranged in a circumferential direction of the piston rod, and at least one of the plurality of second openings may be arranged at a position different in the stroke direction from that of another second opening of the plurality of second openings.

Effects of Disclosure

According to the compression ratio varying mechanism of the present disclosure, it is possible to reduce the stress concentration that occurs in the communication hole.

DESCRIPTION OF EMBODIMENTS

Figure 1:
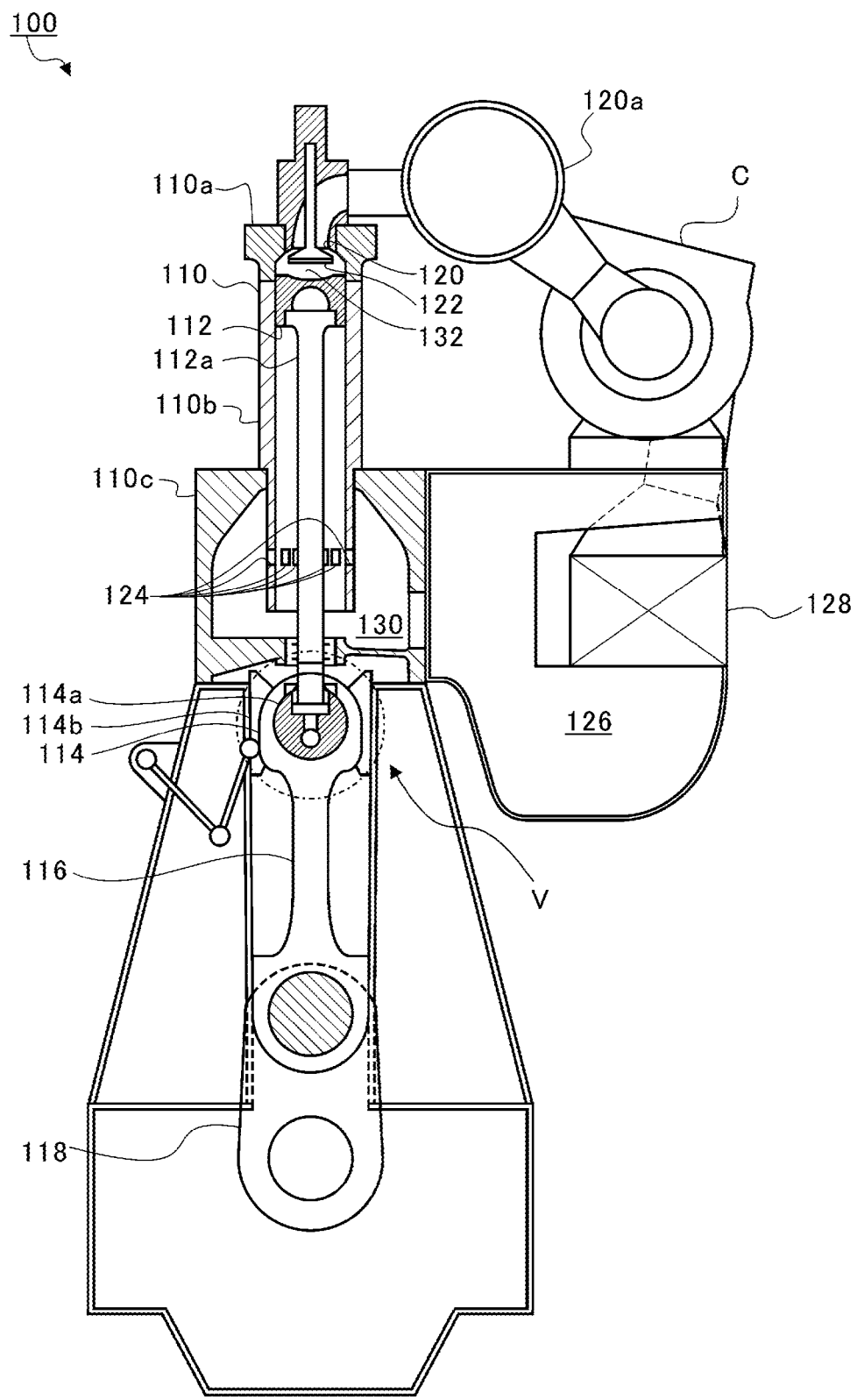
FIG. 1 is an explanatory view for illustrating an overall configuration of a uniflow scavenging type two-cycle engine.

Now, with reference to the attached drawings, an embodiment of the present disclosure is described in detail. The dimensions, materials, and other specific numerical values represented in the embodiments are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

In the embodiment, a description is given of an example of an engine of a uniflow scavenging type in which one cycle is constituted by two cycles (two strokes), and gas flows inside a cylinder in one direction. Moreover, in the embodiment, a description is given of an example of an engine of so-called dual fuel type that can selectively operate any one of operation modes including a gas operation mode and a diesel operation mode. In the gas operation mode, fuel gas, which is a gas fuel, is mainly burnt. In the diesel operation mode, fuel oil, which is a liquid fuel, is burnt. However, the type of the engine is not limited to the dual fuel type, the two-cycle type, the uniflow scavenging type, and the crosshead type, and only needs to be a reciprocating engine.

FIG. 1 is an explanatory view for illustrating an overall configuration of a uniflow scavenging type two-cycle engine (crosshead type engine) 100. The uniflow scavenging type two-cycle engine 100 in this embodiment is used for, for example, a ship. Specifically, the uniflow scavenging type two-cycle engine 100 includes a cylinder 110, a piston 112, a crosshead 114, a connecting rod 116, a crankshaft 118, an exhaust port 120, an exhaust valve 122, scavenging ports 124, a scavenge reservoir 126, a cooler 128, a scavenge chamber 130, and a combustion chamber 132.

In the uniflow scavenging type two-cycle engine 100, the piston 112 reciprocates in the cylinder 110. In the uniflow scavenging type two-cycle engine 100, exhaust, intake, compression, combustion, and expansion are executed during two strokes of the piston 112, which include an upstroke and a downstroke of the piston 112. One end of a piston rod 112a is coupled to the piston 112. A crosshead pin 114a in the crosshead 114 is coupled to another end of the piston rod 112a. The crosshead 114 reciprocates integrally with the piston 112. A movement of the crosshead 114 in a direction perpendicular to a stroke direction of the piston 112 (right-and-left direction of FIG. 1) is restricted by a crosshead shoe 114b.

The crosshead pin 114a is inserted through a hole provided at one end of the connecting rod 116. The crosshead pin 114a supports the one end of the connecting rod 116. Another end of the connecting rod 116 is coupled to the crankshaft 118. The crankshaft 118 is configured to be rotatable with respect to the connecting rod 116. The crosshead 114 reciprocates as the piston 112 reciprocates. The crankshaft 118 rotates as the crosshead 114 reciprocates.

The exhaust port 120 is an opening provided in a cylinder head 110a above a top dead center of the piston 112. The exhaust port 120 is opened and closed so that exhaust gas generated in the cylinder 110 after the combustion is discharged. The exhaust valve 122 is slid up and down at predetermined timings by an exhaust valve drive device (not shown). The exhaust valve 122 is slid up and down, to thereby open and close the exhaust port 120. Exhaust gas discharged through the exhaust port 120 flows into an exhaust pipe 120a. The gas having flowed into the exhaust pipe 120a is supplied to a turbine side of a turbocharger C. The gas supplied to the turbine side of the turbocharger C is discharged to an outside.

The scavenging ports 124 are holes passing from an inner peripheral surface (inner peripheral surface of a cylinder liner 110b) to an outer peripheral surface of the cylinder 110 on a bottom end side. A plurality of scavenging ports 124 are formed over an entire circumference of the cylinder 110. The exhaust ports 124 suck active gas into the cylinder 110 in accordance with a sliding motion of the piston 112. Such active gas includes oxidant such as oxygen and ozone or a mixture thereof (for example, air).

The active gas (for example, air) having been pressurized by a compressor of the turbocharger C is enclosed in the scavenge reservoir 126. The active gas having been pressurized is cooled by the cooler 128. The cooled active gas is forced into the scavenge chamber 130. The scavenge chamber 130 is formed in a cylinder jacket 110c. The cooled active gas is sucked from the scavenging ports 124 into the cylinder 110 by a differential pressure between the scavenge chamber 130 and the cylinder 110.

A pilot injection valve (not shown) is provided in the cylinder head 110a. In the gas operation mode, fuel oil in an appropriate amount is injected from the pilot injection valve at a predetermined timing in the engine cycle. Such fuel oil is vaporized to fuel gas by heat of the combustion chamber 132. The combustion chamber 132 is surrounded by the cylinder head 110a, the cylinder liner 110b, and the piston 112. The fuel gas vaporized by the heat of the combustion chamber 132 is spontaneously ignited, is burnt in a short period, and extremely increases the temperature in the combustion chamber 132. The fuel gas having flowed into the cylinder 110 is reliably burnt at a predetermined timing. The piston 112 reciprocates by an expansion pressure generated mainly by the combustion of the fuel gas.

In this case, the fuel gas is produced by, for example, gasifying a liquefied natural gas (LNG). However, the fuel gas is not limited to those produced by gasifying the LNG, and there may also be used fuel gas produced by gasifying, for example, a liquefied petroleum gas (LPG), a light oil, or a heavy oil.

In the diesel operation mode, the fuel oil in a larger amount than the injection amount of the fuel oil in the gas operation mode is injected from the pilot injection valve. The piston 112 reciprocates through an expansion pressure generated by the combustion of the fuel oil, not the fuel gas.

As described above, the uniflow scavenging type two-cycle engine 100 selectively operates in any one of the operation modes including the gas operation mode and the diesel operation mode. The uniflow scavenging type two-cycle engine 100 includes a compression ratio varying mechanism V. The compression ratio varying mechanism V varies the compression ratio of the piston 112 in accordance with the selected operation mode. A detailed description is now given of a configuration of the compression ratio varying mechanism V.

Figure 2A:
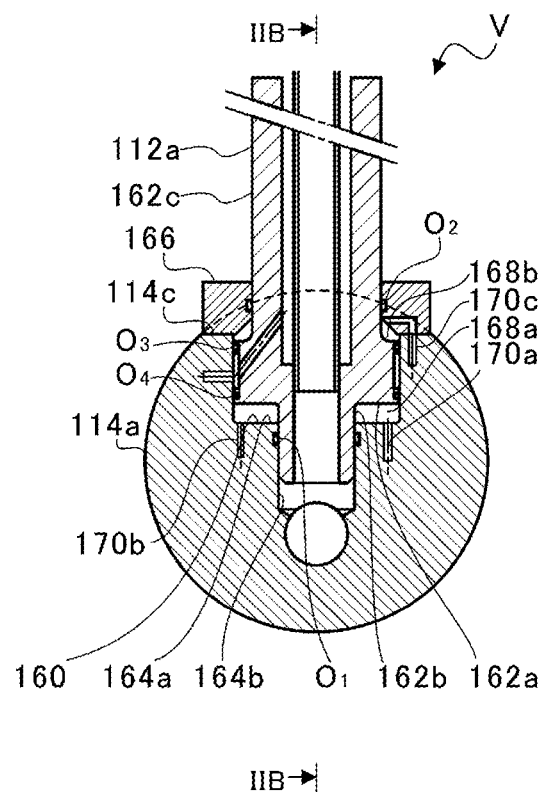
FIG. 2A is an extracted enlarged view for illustrating a portion of a one-dot chain line of FIG. 1.
Figure 2B:
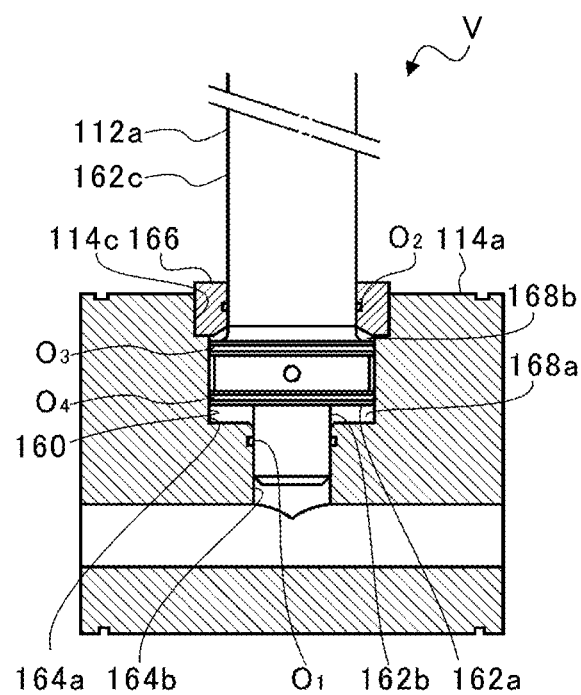
FIG. 2B is a sectional view taken along the line IIB-IIB of FIG. 2A.

FIG. 2A is an extracted enlarged view for illustrating a portion of a one-dot chain line of FIG. 1. FIG. 2B is a sectional view taken along the line IIB-IIB of FIG. 2A.

As illustrated in FIG. 2A and FIG. 2B, an end portion of the piston rod 112a is inserted into the crosshead pin 114a. A connecting hole 160 is formed in the crosshead pin 114a. The connecting hole 160 extends in a direction perpendicular to an axial direction (right-and-left direction of FIG. 2B) of the crosshead pin 114a. The end portion of the piston rod 112a is intertied into (enters) the connecting hole 160. The connecting hole 160 forms a hydraulic chamber described later as a result of the insertion of the end portion of the piston rod 112a. The end portion of the piston rod 112a is inserted into the connecting hole 160, thereby coupling the crosshead pin 114a and the piston rod 112a to each other.

The piston rod 112a has a large-diameter portion 162a, a first small-diameter portion 162b, and a second small-diameter portion (small-diameter portion) 162c. The large-diameter portion 162a has an outer diameter larger than that of one end side of the piston rod 112a. The first small-diameter portion 162b is located on the another end side with respect to the large-diameter portion 162a. The first small-diameter portion 162b has an outer diameter smaller than that of the large-diameter portion 162a. The second small-diameter portion 162c is located on the one end side with respect to the large-diameter portion 162a. The second small-diameter portion 162c has an outer diameter smaller than that of the large-diameter portion 162a. The second small-diameter portion 162c has the outer diameter larger than that of the fist small-diameter portion 162b.

The connecting hole 160 includes a large-diameter hole portion 164a and a small-diameter hole portion 164b. The large-diameter hole portion 164a is located on the piston 112 side in the connecting hole 160. The small-diameter hole portion 164b is continues with the large-diameter hole portion 164a on the connecting rod 116 side. The small-diameter hole portion 164b has an inner diameter smaller than that of the large-diameter hole portion 164a.

The first small-diameter portion 162b of the piston rod 112a has such a dimensional relationship that the first small-diameter portion 162b can be inserted into the small-diameter hole portion 164b of the connecting hole 160. The large-diameter portion 162a of the piston rod 112a has such a dimensional relationship that the large-diameter portion 162a can be inserted into the large-diameter hole portion 164a of the connecting hole 160. A first seal member $O_1$ formed of an O-ring is arranged in an inner peripheral surface of the small-diameter hole portion 164b.

A fixing lid 166 is arranged on the one end side of the piston rod 112a with respect to the large-diameter portion 162a of the piston rod 112a. The fixing lid 166 has an outer diameter larger than that of the connecting hole 160. The fixing lid 166 is an annular member. The second small-diameter portion 162c of the piston rod 112a is inserted through the fixing lid 166. A second seal member $O_2$ formed of an O-ring is arranged in an inner peripheral surface of the fixing lid 166.

A recess 114c recessed in a radial direction of the crosshead pin 114a is formed in an outer peripheral surface of the crosshead pin 114a. The fixing lid 166 is in contact with the recess 114c.

A first hydraulic chamber (hydraulic chamber) 168a and a second hydraulic chamber 168b are formed inside the crosshead pin 114a. The first hydraulic chamber 168a and the second hydraulic chamber 168b are formed in the coupling portion between the piston rod 112a and the crosshead pin 114a.

The first hydraulic chamber 168a is surrounded by a stepped surface defined by a difference in outer diameter between the large-diameter portion 162a and the first small-diameter portion 162b, an inner peripheral surface of the large-diameter hole portion 164a, and a stepped surface defined by a difference in inner diameter between the large-diameter hole portion 164a and the small-diameter hole portion 164b.

The stepped surface defined by the difference in outer diameter between the large-diameter portion 162a and the first small-diameter portion 162b of the piston rod 112a is opposed to the stepped surface defined by the difference in inner diameter between the large-diameter hole portion 164a and the small-diameter hole portion 164b of the crosshead pin 114a. The stepped surface defined by the difference in outer diameter between the large-diameter portion 162a and the first small-diameter portion 162b of the piston rod 112a is hereinafter simply referred to as "stepped surface of the piston rod 112a". Moreover, the stepped surface defined by the difference in inner diameter between the large-diameter hole portion 164a and the small-diameter hole portion 164b of the crosshead pin 114a is hereinafter simply referred to as "stepped surface of the crosshead pin 114a".

The stepped surface of the piston rod 112a and the stepped surface of the crosshead pin 114a form opposed portions opposed to one another. The opposed portions of the piston rod 112a and the crosshead pin 114a form the first hydraulic chamber 168a.

The second hydraulic chamber 168b is surrounded by an end surface of the large-diameter portion 162a on the one end side of the piston rod 112a, the inner peripheral surface of the large-diameter hole portion 164a, and the fixing lid 166. The large-diameter hole portion 164a is partitioned into the one end side and the another end side of the piston rod 112a by the large-diameter portion 162a of the piston rod 112a.

That is, the first hydraulic chamber 168a is formed of the large-diameter hole portion 164a partitioned on the another end side with respect to the large-diameter portion 162a. Moreover, the second hydraulic chamber 168b is formed of the large-diameter hole portion 164a partitioned on the one end side with respect to the large-diameter portion 162a.

A first hydraulic chamber supply oil passage 170a and a first hydraulic chamber discharge oil passage 170b communicate with the first hydraulic chamber 168a. One end of the first hydraulic chamber supply oil passage 170a is opened in the inner peripheral surface (first hydraulic chamber 168a) of the large-diameter hole portion 164a. Another end of the first hydraulic chamber supply oil passage 170a communicates with a hydraulic pump through a plunger pump described later. One end of the first hydraulic chamber discharge oil passage 170b is opened in the inner peripheral surface of the large-diameter hole portion 164a. Another end of the first hydraulic chamber discharge oil passage 170b communicates with a tank through a spill valve described later.

An auxiliary oil passage 170c opened in a wall surface of the fixing lid 166 communicates with the second hydraulic chamber 168b. The auxiliary oil passage 170c communicates with the hydraulic pump through the contact portion between the fixing lid 166 and the crosshead pin 114a, and through the inside of the crosshead pin 114a.

Figure 3A:
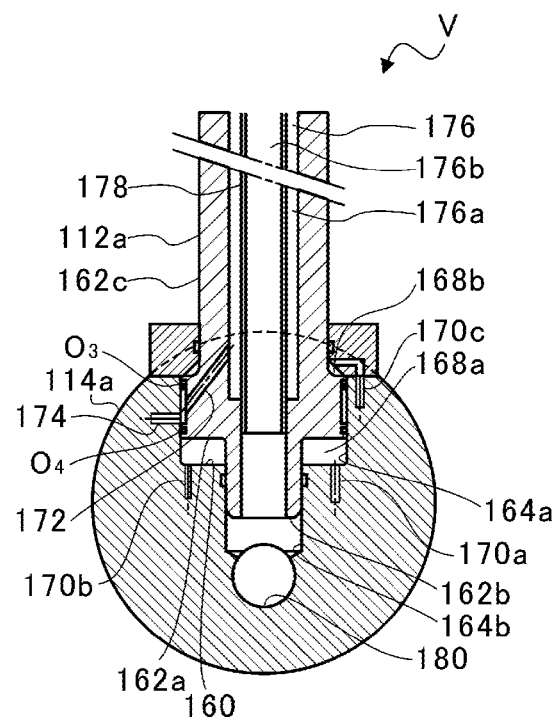
FIG. 3A is a view for illustrating a state in which a piston rod shallowly enters a connecting hole.

FIG. 3A is a view for illustrating a state in which the piston rod 112a shallowly enters the connecting hole 160.

Figure 3B:
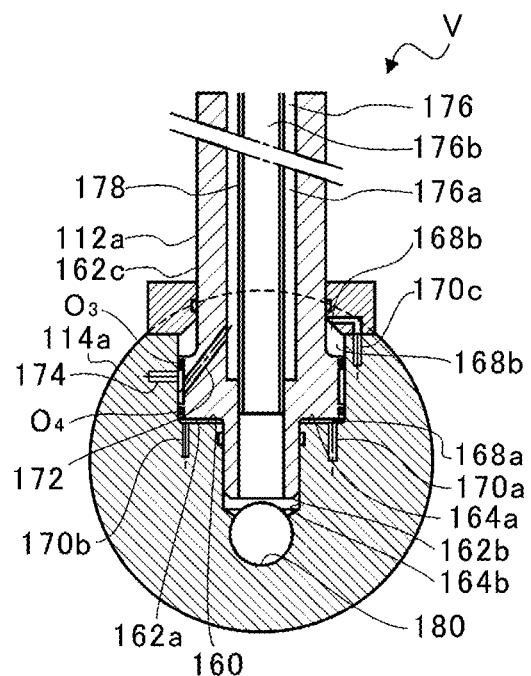
FIG. 3B is a view for illustrating a state in which the piston rod deeply enters the connecting hole.

FIG. 3B is a view for illustrating a state in which the piston rod 112a deeply enters the connecting hole 160.

The first hydraulic chamber 168a has a length which is variable in the stroke direction of the piston 112. The working oil can be supplied to the first hydraulic chamber 168a through the first hydraulic chamber supply oil passage 170a.

When the working oil is supplied to the first hydraulic chamber 168a, the length of the first hydraulic chamber 168a increases in the stroke direction of the piston 112 as illustrated in FIG. 3A. Meanwhile, the length of the second hydraulic chamber 168b decreases in the stroke direction of the piston 112. The working oil is incompressible. Therefore, when the first hydraulic chamber 168a is sealed in the state in which the working oil is supplied to the first hydraulic chamber 168a, the state of FIG. 3A can be maintained.

The first hydraulic chamber 168a can discharge the working oil through the first hydraulic chamber discharge oil passage 170b. When the working oil is discharged from the first hydraulic chamber 168a, the length of the first hydraulic chamber 168a in the stroke direction of the piston 112 decreases as illustrated in FIG. 3B. Meanwhile, the length of the second hydraulic chamber 168b increases in the stroke direction of the piston 112.

As described above, the piston rod 112a and the crosshead pin 114a change an overall length of the piston rod 112a and the crosshead pin 114a in the stroke direction. The overall length of the piston 112 including the piston rod 112a and the crosshead pin 114a in the stroke direction changes in accordance with the separation distance between the stepped surface of the piston rod 112a and the stepped surface of the crosshead pin 114a in the stroke direction.

An entry position (entry depth) up to which the piston rod 112a enters the connecting hole (hydraulic chambers) 160 of the crosshead pin 114a is changed by the amount of the change in length of the first hydraulic chamber 168a and the second hydraulic chamber 168b in the stroke direction of the piston 112. As described above, the positions of the top dead center and the bottom dead center of the piston 112 are changed through changing the relative position between the piston rod 112a and the crosshead pin 114a.

The piston rod 112a is coupled to the crosshead pin 114a. However, in the state of FIG. 3B, the piston rod 112a has play by an amount of the second hydraulic chamber 168b.

When the piston 112 reaches the top dead center in the state of FIG. 3B, an inertial force is applied to the piston rod 112a on the piston 112 side. The piston rod 112a may move toward the piston 112 side by the inertial force in some cases. The hydraulic pressure from the hydraulic pump is supplied to the second hydraulic chamber 168b through the auxiliary oil passage 170c, to thereby prevent the occurrence of the displacement of the top dead center position. The movement of the piston rod 112a toward the piston 112 side is suppressed by supplying the hydraulic pressure to the second hydraulic chamber 168b.

The uniflow scavenging type two-cycle engine 100 is used at a relatively low rotation speed. Therefore, the inertial force applied to the piston rod 112a is relatively small. Therefore, even when the hydraulic pressure supplied to the second hydraulic chamber 168b is low, the displacement of the top dead center position of the piston 112 can be suppressed.

A flow-through portion 172 extending from an outer peripheral side surface toward a radially inner side of the piston rod 112a is provided in the piston rod 112a. A through hole 174 passing from an outer peripheral surface side of the crosshead pin 114a to the connecting hole 160 is provided in the crosshead pin 114a. The through hole 174 communicates with the hydraulic pump.

Figure 4:
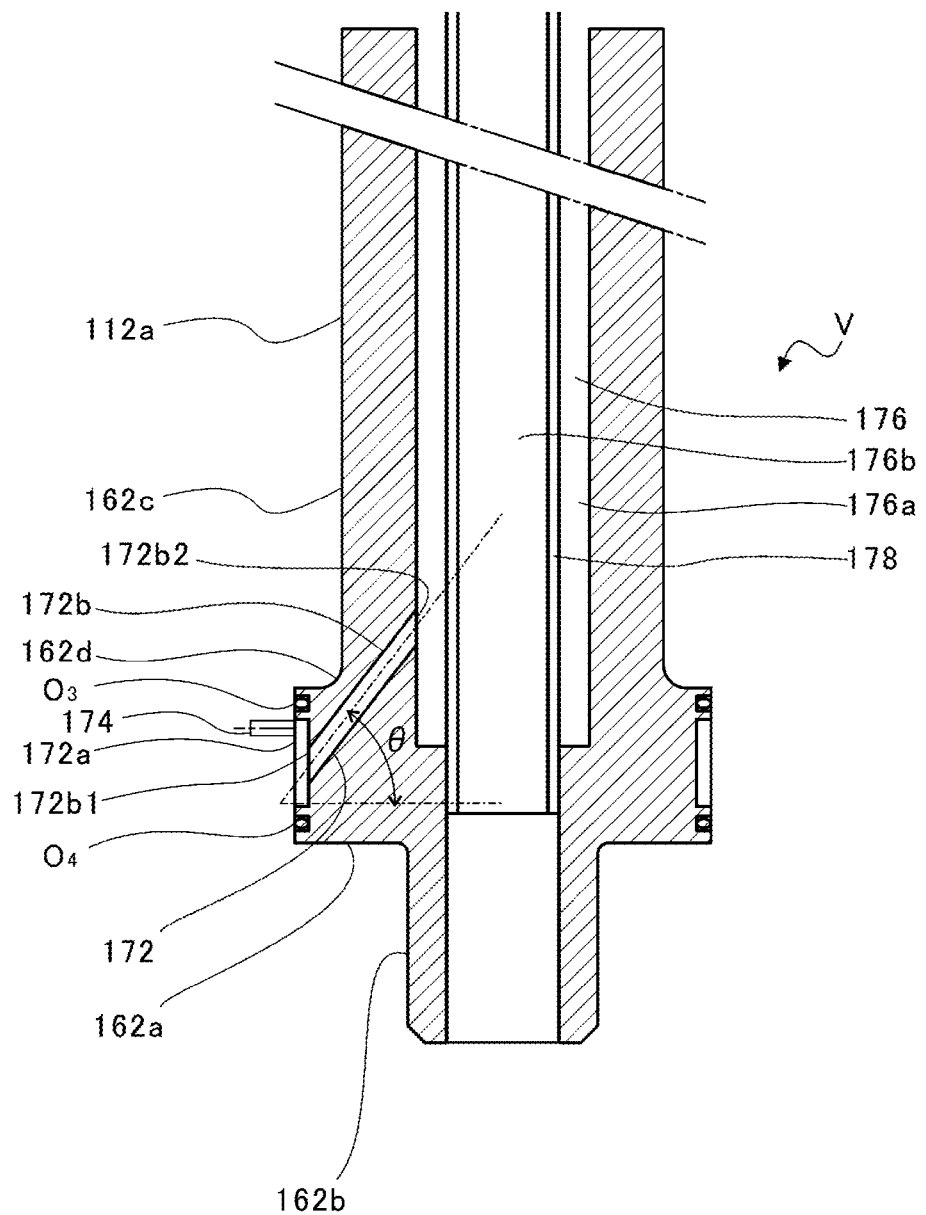
FIG. 4 is a partial enlarged view for illustrating the vicinity of a flow-through portion of the piston rod.

FIG. 4 is a partial enlarged view for illustrating the vicinity of the flow-through portion 172 of the piston rod 112a. The flow-through portion 172 and the through hole 174 are opposed to each other in a radial direction of the piston rod 112a. The flow-through portion 172 communicates with the through hole 174.

As illustrated in FIG. 4, the flow-through portion 172 includes an annular groove 172a and a communication hole 172b. The annular groove 172a is formed in an outer peripheral side surface of the large-diameter portion 162a of the piston rod 112a. The communication hole 172b is arranged on an inner peripheral surface side of the piston rod 112a with respect to the annular groove 172a.

The annular groove 172a has a substantially annular shape. The annular groove 172a has a constant depth in the radial direction of the piston rod 112a. The communication hole 172b has a circular shape in the cross section of the flow passage, and has a constant inner diameter. A width of the annular groove 172a in the stroke direction (up-and-down direction of FIG. 4) of the piston 112 is larger than a width of the communication hole 172b in the stroke direction of the piston 112.

Thus, as illustrated in FIG. 3A and FIG. 3B, even when the relative position between the piston rod 112a and the crosshead pin 114a changes, the communication state between the flow-through portion 172 and the through hole 174 is maintained.

A third seal member $O_3$ and a fourth seal member $O_4$ are arranged in the outer peripheral surface of the piston rod 112a. Specifically, the pair of seal members (third seal member $O_3$ and fourth seal member $O_4$) apart from each other in the stroke direction of the piston 112 are arranged in the outer peripheral side surface of the large-diameter portion 162a of the piston rod 112a. The annular groove 172a of the flow-through portion 172 is formed between the third seal member $O_3$ and the fourth seal member $O_4$.

An oil passage 176 extending in the stroke direction of the piston 112 is formed inside the piston rod 112a. Cooling oil for cooling the piston 112 and the piston rod 112a flows through the oil passage 176. A cooling pipe 178 is arranged inside the oil passage 176. The oil passage 176 is divided by the cooling pipe 178 into an outward passage 176a on the outer side and a return passage 176b on the inner side in the radial direction of the piston rod 112a. The flow-through portion 172 is opened to the outward passage 176a of the oil passage 176.

One end of the communication hole 172b is opened to (connected to) the annular groove 172a (the outer peripheral side surface of the piston rod 112a). Another end of the communication hole 172b is opened to (connected to) the oil passage 176 (the inner peripheral surface of the piston rod 112a).

The communication hole 172b has a first opening 172b1 at a communication portion communicating with the annular groove 172a. The communication hole 172b has a second opening 172b2 at a communication portion communicating with the oil passage 176. The first opening 172b1 is opened in the outer peripheral side surface of the large-diameter portion 162a of the piston rod 112a through the annular groove 172a. The second opening 172b2 is opened in the inner peripheral surface of the piston rod 112a. Specifically, the second opening 172b2 is opened in an inner peripheral surface of the second small-diameter portion 162c of the piston rod 112a.

Incidentally, stress concentration is liable to occur in the communication hole 172*b* due to application of a combustion pressure in the combustion chamber 132. When the communication hole 172*b* extends in the radial direction of the piston rod 112*a*, the stress concentration is liable to occur particularly in the communication hole 172*b*.

The stress concentration that occurs in the communication hole 172*b* changes in accordance with an angle formed between a center axis of the communication hole 172*b* and the radial direction of the piston rod 112*a* (hereinafter simply referred to as "inclination angle of the communication hole 172*b*"). The stress concentration that occurs in the communication hole 172*b* can be reduced as the inclination angle of the communication hole 172*b* is closer to the stroke direction of the piston 112. That is, the stress concentration is alleviated as the communication hole 172*b* is inclined in the stroke direction of the piston 112 compared with a case in which the communication hole 172*b* extends in the radial direction of the piston rod 112*a*.

When the communication hole 172*b* extends in the radial direction of the piston rod 112*a*, the first opening 172*b*1 and the second opening 172*b*2 are opposed to each other. In other words, when the first opening 172*b*1 and the second opening 172*b*2 are opposed to each other in the radial direction of the piston rod 112*a*, the stress concentration is liable to occur in the communication hole 172*b*. With this configuration, the stress concentration is liable to occur also in a case in which the communication hole 172*b* is inclined to such a degree that the first opening 172*b*1 and the second opening 172*b*2 are opposed to each other. Thus, in this embodiment, the communication hole 172*b* is formed so that the first opening 172*b*1 and the second opening 172*b*2 are prevented from being opposed to each other in the radial direction of the piston rod 112*a*.

That is, the first opening 172*b*1 is formed at the position apart from the second opening 172*b*2 in the stroke direction of the piston 112 without overlapping the second opening 172*b*2 in the radial direction of the piston rod 112*a*. In other words, the second opening 172*b*2 is formed at the position apart from the first opening 172*b*1 in the stroke direction of the piston 112 without overlapping the first opening 172*b*1 in the radial direction of the piston rod 112*a*.

The first opening 172*b*1 and the second opening 172*b*2 are more apart from each other as the inclination angle of the communication hole 172*b* is closer to the stroke direction of the piston 112. That is, the stress concentration that occurs in the communication hole 172*b* can be reduced as the first openings 172*b*1 and the second openings 172*b*2 are more apart from each other in the stroke direction of the piston 112.

As a result, the stress concentration that occurs in the communication hole 172*b* can be reduced compared with the case in which the first opening 172*b*1 and the second opening 172*b*2 overlap each other in the radial direction of the piston rod 112*a*.

The first opening 172*b*1 is arranged in a region between the third seal member $O_3$ and the fourth seal member $O_4$ in the stroke direction of the piston 112. The second opening 172*b*2 is arranged outside the region between the third seal member $O_3$ and the fourth seal member $O_4$ in the stroke direction of the piston 112. In this embodiment, the third seal member $O_3$ is arranged between the first opening 172*b*1 and the second opening 172*b*2 in the stroke direction of the piston 112. However, the configuration is not limited to this example, and the fourth seal member $O_4$ may be arranged between the first opening 172*b*1 and the second opening 172*b*2 in the stroke direction of the piston 112. That is, any one of the pair of seal members (the third seal member $O_3$ and the fourth seal member $O_4$) is arranged between the first opening 172*b*1 and the second opening 172*b*2 in the stroke direction of the piston 112.

As a result, the first opening 172*b*1 can communicate with the through hole 174 formed in the crosshead pin 114*a* through the annular groove 172*a*. Moreover, the second opening 172*b*2 is prevented from being opposed to the first opening 172*b*1 in the radial direction of the piston rod 112*a*. The stress concentration can be reduced by arranging the first opening 172*b*1 and the second opening 172*b*2 of the communication hole 172*b* so as to be prevented from being opposed to each other. Moreover, a resistance against the flow of the cooling oil can be reduced by arranging the first opening 172*b*1 and the second opening 172*b*2 so as to be prevented from being opposed to each other.

In this embodiment, the second opening 172*b*2 is formed so as to be apart from the first opening 172*b*1 at least by a width of the third seal member $O_3$ or the fourth seal member $O_4$ in the stroke direction of the piston 112.

A stepped portion is formed in the piston rod 112*a* due to a difference in outer diameter between the large-diameter portion 162*a* and the second small-diameter portion 162*c*. In the stepped portion, a curved surface portion 162*d* is formed over the entire circumference of the piston rod 112*a* in the circumferential direction. The curved surface portion 162*d* connects the outer peripheral surface of the large-diameter portion 162*a* and the outer peripheral surface of the second small-diameter portion 162*c* to each other. The curved surface portion 162*d* reduces stress concentration that occurs in the stepped portion when the combustion pressure is applied to the piston rod 112*a*.

The second opening 172*b*2 is arranged at a position different from (position apart from) the curved surface portion 162*d* in the stroke direction of the piston 112. Specifically, the second opening 172*b*2 is arranged on the piston 112 side (toward the upward direction of FIG. 4) with respect to the curved surface portion 162*d*.

The second opening 172*b*2 is arranged at a position not overlapping the curved surface portion 162*d* in the radial direction of the piston rod 112*a*. In other words, the curved surface portion 162*d* is arranged between the first opening 172*b*1 and the second opening 172*b*2 in the stroke direction of the piston 112.

The stress concentration is liable to occur at the curved surface portion 162*d* due to the application of the combustion pressure. Therefore, the stress concentration is less liable to occur when the second opening 172*b*2 is formed at a position apart from the curved surface portion 162*d* than when the second opening 172*b*2 is formed at a position close to the curved surface portion 162*d*. Thus, it is preferred that the second opening 172*b*2 be arranged a position apart from the curved surface portion 162*d* in the stroke direction of the piston 112.

A plurality of communication holes 172*b* are arranged in the circumferential direction of the piston rod 112*a*. In this embodiment, eight communication holes 172*b* are arranged apart from each other in the circumferential direction of the piston rod 112*a*. The plurality of communication holes 172*b* are arranged at equal intervals in the circumferential direction of the piston rod 112*a*.

However, the configuration is not limited to this example, and the number of communication holes 172*b* is not required be two or more, and may be, for example, one (single). Moreover, the number of the plurality of communication holes 172*b* may be less than eight, or equal to or more than eight. Moreover, the plurality of communication holes 172*b* may be arranged at unequal intervals in the circumferential direction of the piston rod 112*a*.

In this embodiment, all of the plurality of (eight) communication holes 172*b* are arranged at the same positions in the stroke direction of the piston 112. In this configuration, the meaning of "same" includes the case of being "completely the same" and the case of deviating from the state of being "completely the same" within the range of the tolerance (machining precisions, assembly errors, and the like).

However, the configuration is not limited to this example, and all of the plurality of (eight) first openings 172*b*1 and second openings 172*b*2 may be arranged at positions different from one another in the stroke direction of the piston 112. Moreover, some of the plurality of (eight) first openings 172*b*1 may be arranged at positions different from positions of some others of the plurality of (eight) first openings 172*b*1 in the stroke direction of the piston 112.

That is, at least one of the plurality of (eight) first openings 172*b*1 may be arranged at a position different from positions of other first openings 172*b*1 of the plurality of (eight) first openings 172*b*1 in the stroke direction of the piston 112.

Moreover, some of the plurality of (eight) second openings 172*b*2 may be arranged at positions different from positions of some others of the plurality of (eight) second openings 172*b*2 in the stroke direction of the piston 112. That is, at least one of the plurality of (eight) second openings 172*b*2 may be arranged at a position different from positions of other second openings 172*b*2 of the plurality of (eight) second openings 172*b*2 in the stroke direction of the piston 112.

The stress concentration is liable to occur in the communication hole 172*b* due to the application of the combustion pressure. Therefore, in the case in which a plurality of communication holes 172*b* are formed, the stress concentration is less liable to occur when the plurality of communication holes 172*b* are formed at positions apart from each other than when the plurality of communication holes 172*b* are formed at positions close to each other. Thus, it is preferred that the plurality of communication holes 172*b* (first openings 172*b*1 and second openings 172*b*2) be formed at positions apart from each other in the stroke direction of the piston 112.

As described above, the communication holes 172*b* are each formed at such a position that the first opening 172*b*1 and the second opening 172*b*2 are apart from each other in the stroke direction of the piston 112 without overlapping each other in the radial direction of the piston rod 112*a*. As a result, the stress concentration that occurs in the communication holes 172*b* can be reduced.

Incidentally, as the inner diameter of the communication holes 172*b* increases, the stress concentration that occurs in the communication holes 172*b* increases. Moreover, as the outer diameter of the large-diameter portion 162*a* of the piston rod 112*a* decreases, the stress concentration that occurs in the communication holes 172*b* increases. Further, as the strength of a material of the piston rod 112*a* decreases, the stress concentration that occurs in the communication holes 172*b* is more liable to exceed a yield stress of the piston rod 112*a*.

Meanwhile, the stress concentration that occurs in the communication holes 172*b* can be reduced as the inclination angle of the communication holes 172*b* is closer to the stroke direction of the piston 112. Thus, as the inclination angle of the communication holes 172*b* increases, the inner diameter of the communication holes 172*b* can be set to be larger. Moreover, as the inclination angle of the communication holes 172*b* increases, the outer diameter of the large-diameter portion 162*a* of the piston rod 112*a* can be set to be smaller. Further, as the inclination angle of the communication holes 172*b* increases, the strength of the material of the piston rod 112*a* can be set to be lower.

That is, as the inclination angle of the communication holes 172*b* increases, a degree of freedom in design of the piston rod 112*a* can be increased. In order to increase the degree of freedom in design of the piston rod 112*a*, it is preferred that the inclination angle θ of the communication hole 172*b* be set to 40° or larger.

When the inclination angle of the communication hole 172*b* is set to 40° or larger, the degree of freedom in design of the piston rod 112*a* can be increased. Specifically, when the inclination angle of the communication hole 172*b* is set to 40° or larger, an application range of the inner diameter of the communication hole 172*b* can be increased. Moreover, an application range of the outer diameter of the large-diameter portion 162*a* of the piston rod 112*a* can be increased. Further, an application range of the material of the piston rod 112*a* can be increased.

However, when the inclination angle of the communication hole 172*b* is larger than a predetermined value, the formation of the communication hole 172*b* may be difficult. Thus, it is preferred that the inclination angle of the communication hole 172*b* be 65° or smaller. As a result, it is preferred that the inclination angle of the communication hole 172*b* be set to a range of from 40° or larger to 65° or smaller.

The range of the inclination angle of the communication hole 172*b* changes in accordance with, for example, the inner diameter of the communication hole 172*b* and the outer diameter of the large-diameter portion 162*a* of the piston rod 112*a*.

A lower limit value of the range of the inclination angle of the communication hole 172*b* is set to a larger angle as the inner diameter of the communication hole 172*b* increases. Moreover, the lower limit value of the range of the inclination angle of the communication hole 172*b* is set to a smaller angle as the outer diameter of the large-diameter portion 162*a* increases.

Figure 5:
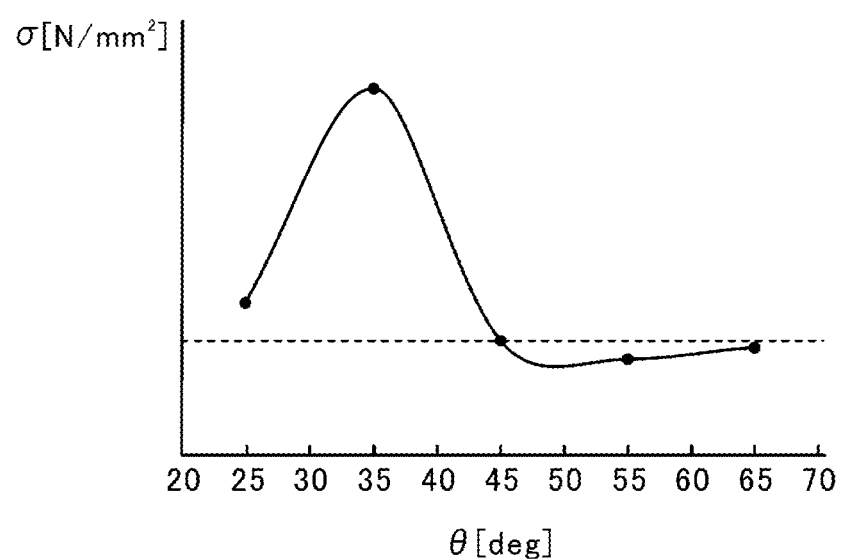
FIG. 5 is a graph for showing a relationship between a stress that is generated in a communication hole and an inclination angle of the communication hole.

FIG. 5 is a graph for showing a relationship between a stress σ that is generated in the communication hole 172*b* and the inclination angle θ of the communication hole 172*b*. A solid line indicates the stress σ that is generated in the communication hole 172*b* when the combustion pressure is applied to the piston 112*a*. A broken line indicates the yield stress of the piston rod 112*a*.

In FIG. 5, there is exemplarily shown a case in which the inner diameter of the communication hole 172*b* is 16 mm, the outer diameter of the large-diameter portion 162*a* is 370 mm, and the combustion pressure applied to the piston rod 112*a* is 1,000 bar. As shown in FIG. 5, when the inclination angle θ of the communication hole 172*b* is 45° or larger, the stress θ that is generated in the communication hole 172*b* is less than the yield stress of the piston rod 112*a*. Therefore, in the example of FIG. 5, it is can be seen that the inclination angle θ of the communication holes 172*b* be set to, preferably, 45° or larger.

As described above, the inclination angle of the communication hole 172*b* is set to the angle in accordance with the inner diameter of the communication hole 172*b* and the outer diameter of the large-diameter portion 162*a* of the piston rod 112*a*, thereby being capable of increasing the degree of freedom in design of the piston rod 112*a*.

Returning to FIG. 3B, the cooling oil supplied from the hydraulic pump flows into the outward passage 176*a* of the oil passage 176 through the through hole 174 and the flow-through portion 172. The outward passage 176a and the return passage 176b communicate with each other inside the piston 112. When the cooling oil having flowed through the outward passage 176a reaches an inner wall of the piston 112, the cooling oil passes through the return passage 176b, and returns to the first small-diameter portion 162b side. The cooling oil comes in contact with an inner wall of the oil passage 176 and the inner wall of the piston 112, thereby cooling the piston 112.

An outlet hole 180 extending in the axial direction of the crosshead pin 114a is formed in the crosshead pin 114a. The small-diameter hole portion 164b communicates with the outlet hole 180. The cooling oil having cooled the piston 112 flows from the oil passage 176 into the small-diameter hole portion 164b. The cooling oil having flowed into the small-diameter hole portion 164b is discharged to the outside of the crosshead pin 114a through the outlet hole 180 and flows back to the tank.

Both of the working oil supplied to the first hydraulic chamber 168a and the second hydraulic chamber 168b and the cooling oil supplied to the oil passage 176 flow back to the same tank, and are increased in pressure by the same hydraulic pump. Therefore, the supply of the working oil that applies the hydraulic pressure and the supply of the cooling oil for the cooling can be executed by the one hydraulic pump, thereby being capable of reducing a cost.

The compression ratio varying mechanism V configured to vary the compression ratio of the piston 112 includes a hydraulic pressure adjustment mechanism 196 configured to adjust the hydraulic pressure in the first hydraulic chamber 168a. A detailed description is now given of a configuration of the hydraulic pressure adjustment mechanism 196. The hydraulic pressure adjustment mechanism 196 includes a plunger pump 182, a spill valve 184, and a drive mechanism D.

Figure 6:
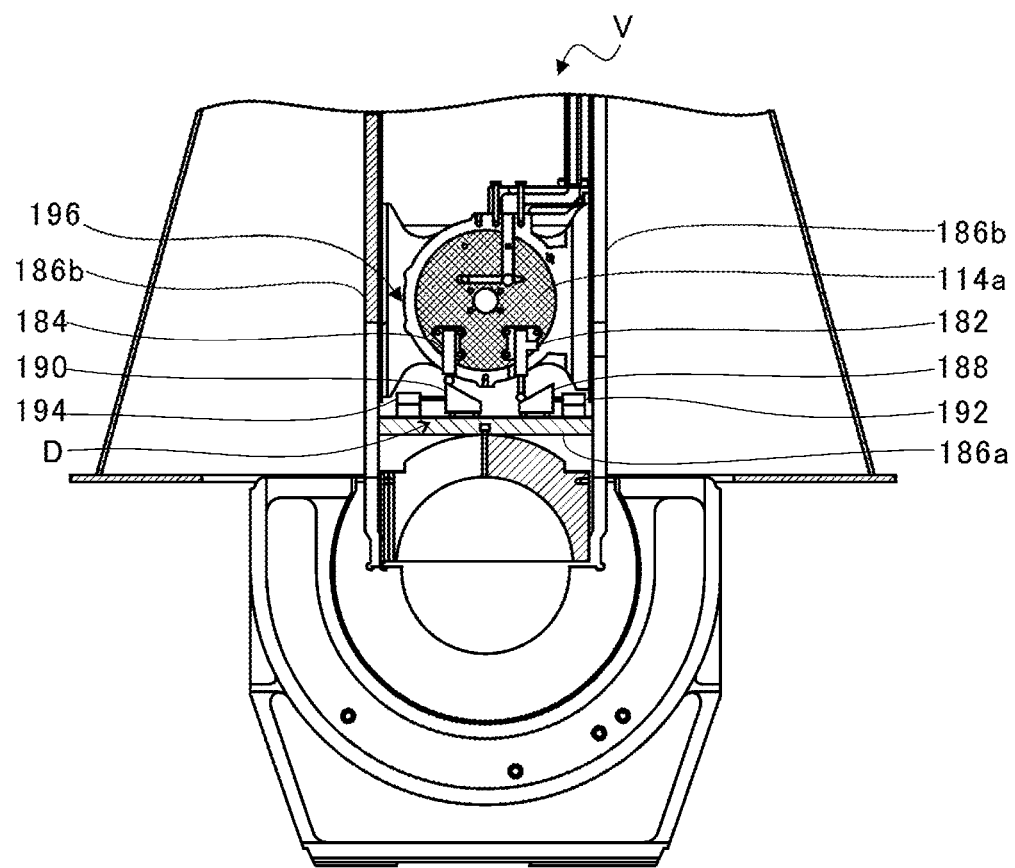
FIG. 6 is an explanatory view for illustrating an arrangement of a plunger pump, a spill valve, and a drive mechanism.

FIG. 6 is an explanatory view for illustrating an arrangement of the plunger pump 182, the spill valve 184, and the drive mechanism D. In FIG. 6, an appearance and a partial section in a vicinity of the crosshead 114 of the uniflow scavenging type two-cycle engine 100 are illustrated. The plunger pump 182 and the spill valve 184 are respectively mounted to the crosshead pin 114a indicated by crosshatching of FIG. 6.

An engine bridge 186a is arranged below the plunger pump 182 and the spill valve 184, respectively. Both ends of the engine bridge 186a are mounted to two guide plates 186b configured to guide the reciprocation of the crosshead 114, to thereby support both of the guide plates 186b.

The drive mechanism D is placed on the engine bridge 186a. The drive mechanism D includes a first cam plate 188, a second cam plate 190, a first actuator 192, and a second actuator 194. The first cam plate 188 and the second cam plate 190 can be moved by the first actuator 192 and the second actuator 194, respectively, on the engine bridge 186a in the right-and-left direction of FIG. 6.

The plunger pump 182 and the spill valve 184 reciprocate integrally with the crosshead pin 114a in the stroke direction of the piston 112. Meanwhile, the first cam plate 188 and the second cam plate 190 are placed on the engine bridge 186a, and do not move in the stroke direction of the piston 112 with respect to the engine bridge 186a.

Figure 7:
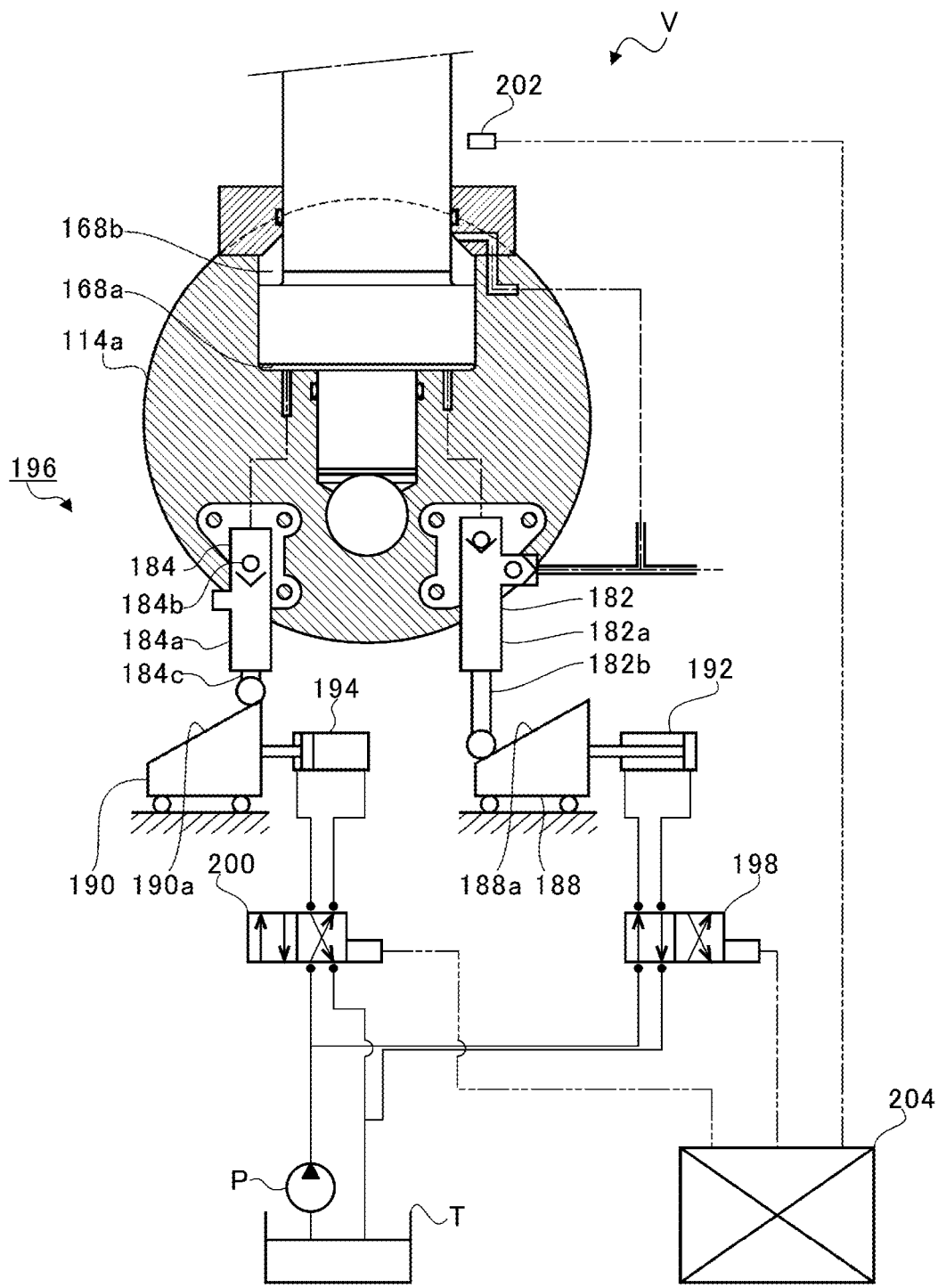
FIG. 7 is an explanatory view for illustrating a configuration of a hydraulic pressure adjustment mechanism.

FIG. 7 is an explanatory view for illustrating a configuration of the hydraulic pressure adjustment mechanism 196. As illustrated in FIG. 7, the hydraulic pressure adjustment mechanism 196 includes a first selector valve 198, a second selector valve 200, a position sensor 202, and a hydraulic pressure controller 204.

The plunger pump 182 includes a pump cylinder 182a and a plunger 182b. The working oil is introduced into an inside of the pump cylinder 182a through a supply oil passage communicating with the hydraulic pump P. The plunger 182b moves in the pump cylinder 182a in the stroke direction. One end of the plunger 182b protrudes from the pump cylinder 182a.

The first cam plate 188 includes an inclined surface 188a inclined with respect to the stroke direction of the piston 112. The first cam plate 188 is arranged below the plunger pump 182 in the stroke direction. When the plunger pump 182 moves in the stroke direction, the one end of the plunger 182b protruding from the pump cylinder 182a comes in contact with the inclined surface 188a of the first cam plate 188 at a crank angle close to the bottom dead center.

The plunger 182b receives a reaction force resisting a reciprocating force of the crosshead 114 from the inclined surface 188a of the first cam plate 188, and is consequently pushed into the pump cylinder 182a. At this time, the plunger pump 182 supplies (presses) the working oil in the pump cylinder 182a to (into) the first hydraulic chamber 168a.

The first actuator 192 is operated through use of the hydraulic pressure of the working oil supplied through the first selector valve 198. The first actuator 192 moves the first cam plate 188 in a direction (in this configuration, a direction perpendicular to the stroke direction) intersecting the stroke direction of the first cam plate 188. That is, the first actuator 192 can move the first cam plate 188, to thereby change a relative position of the first cam plate 188 with respect to the plunger 182b.

When the first cam plate 188 moves in the direction perpendicular to the stroke direction, the contact position between the plunger 182b and the first cam plate 188 in the stroke direction relatively changes. For example, when the first cam plate 188 moves toward a left side of FIG. 7, the contact position is displaced upward in the stroke direction. When the first cam plate 188 moves toward a right side of FIG. 7, the contact position is displaced downward in the stroke direction. The maximum amount to be pushed into the pump cylinder 182a is set in accordance with the contact position between the plunger 182b and the first cam plate 188.

The spill valve 184 includes a main body 184a, a valve body 184b, and a rod 184c. An internal flow passage through which the working oil having been discharged from the first hydraulic chamber 168a flows is formed inside the main body 184a of the spill valve 184. The valve body 184b is arranged in the internal flow passage of the main body 184a. The rod 184c has one end opposed to the valve body 184b inside the main body 184a, and another end protruding from the main body 184a.

The second cam plate 190 includes an inclined surface 190a inclined with respect to the stroke direction. The second cam plate 190 is arranged below the rod 184c in the stroke direction. When the spill valve 184 moves in the stroke direction, the one end of the rod 184c protruding from the main body 184a of the spill valve 184 comes in contact with the inclined surface 190a of the second cam plate 190 at a crank angle close to the bottom dead center.

The rod 184c receives a reaction force resisting the reciprocating force of the crosshead 114 from the inclined surface 190a of the second cam plate 190, and is consequently pushed into the main body 184a. When the rod 184c is pushed into the main body 184a by an amount equal to or larger than a predetermined amount, the spill valve 184 moves the valve body 184b. In the spill valve 184, when the valve body 184b moves, the working oil comes to be able to flow through the internal flow passage, and the working oil is thus discharged from the first hydraulic chamber 168a toward a tank T.

The second actuator 194 is operated through use of the hydraulic pressure of the working oil supplied through the second selector valve 200. The second actuator 194 moves the second cam plate 190 in a direction (in this configuration, a direction perpendicular to the stroke direction) intersecting the stroke direction of the second cam plate 190. That is, the second actuator 194 can move the second cam plate 190, to thereby change a relative position of the second cam plate 190 with respect to the rod 184c.

The contact position between the rod 184c and the second cam plate 190 in the stroke direction changes in accordance with the relative position of the second cam plate 190. For example, when the second cam plate 190 moves toward the left side of FIG. 7, the contact position is displaced upward in the stroke direction. Moreover, when the second cam plate 190 moves toward the right side of FIG. 7, the contact position is displaced downward in the stroke direction. The maximum amount to be pushed into the main body 184a is set in accordance with the contact position between the rod 184c and the second cam plate 190.

The position sensor 202 detects a position of the piston rod 112a in the stroke direction, to thereby output a signal indicating the position in the stroke direction.

The hydraulic pressure controller 204 acquires the signal from the position sensor 202, and identifies the relative position between the piston rod 112a and the crosshead pin 114a. The hydraulic pressure controller 204 causes the first actuator 192 and the second actuator 194 to drive to adjust the hydraulic pressure (oil amount of the working oil) in the first hydraulic chamber 168a. The hydraulic pressure controller 204 is configured to adjust the hydraulic pressure (oil amount of the working oil) in the first hydraulic chamber 168a so that a relative position between the piston rod 112a and the crosshead pin 114a is at the set position.

Figure 8A:
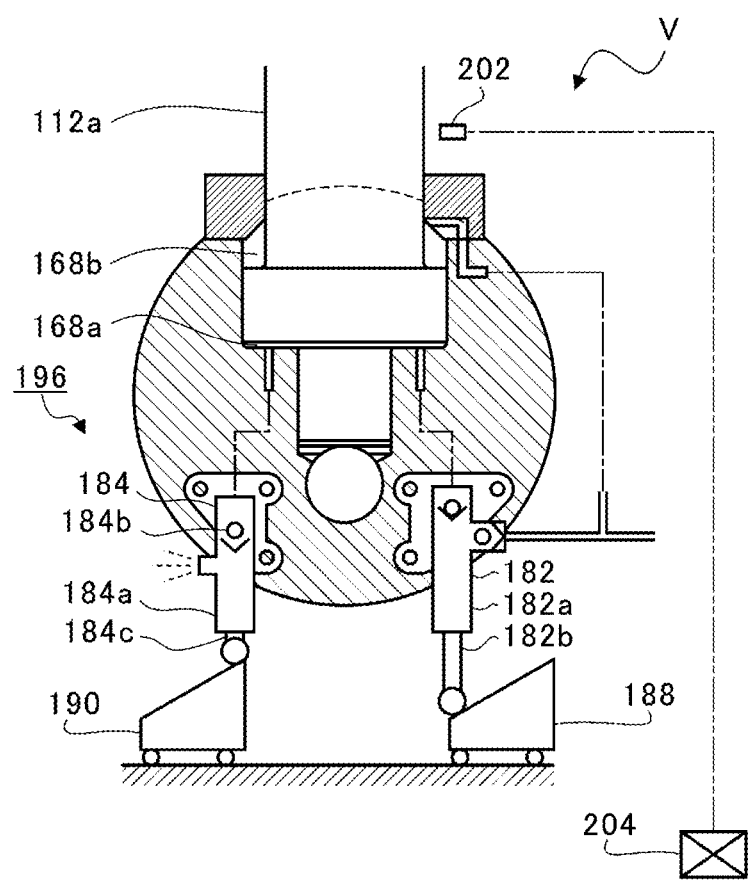
FIG. 8A is an explanatory view for illustrating operation of a compression ratio varying mechanism when working oil is discharged from a first hydraulic chamber.
Figure 8B:
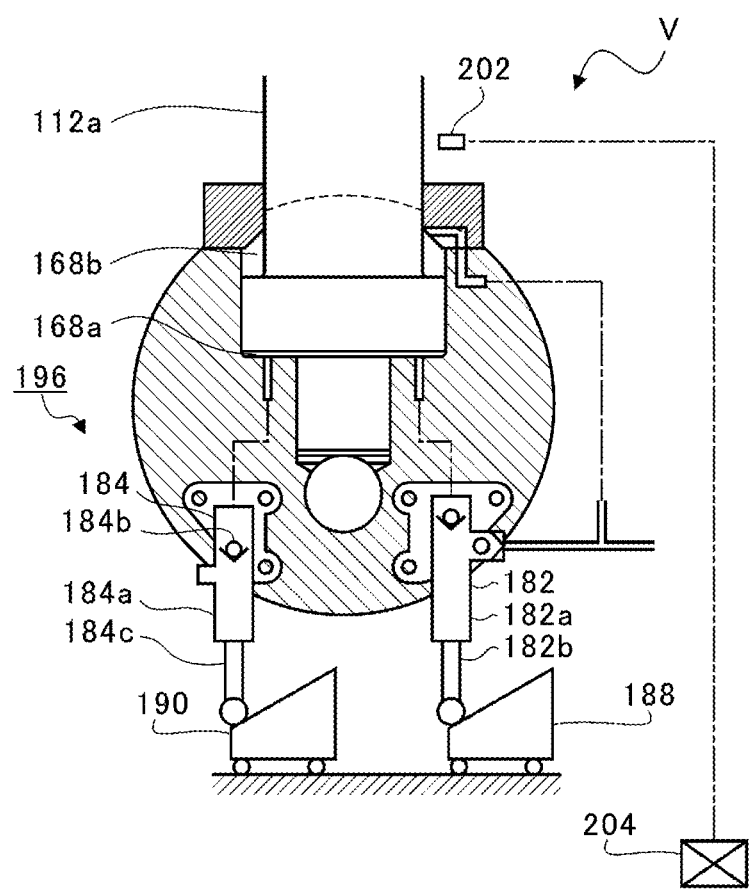
FIG. 8B is an explanatory view for illustrating operation of the compression ratio varying mechanism when the discharge of the working oil in the first hydraulic chamber is stopped.
Figure 8C:
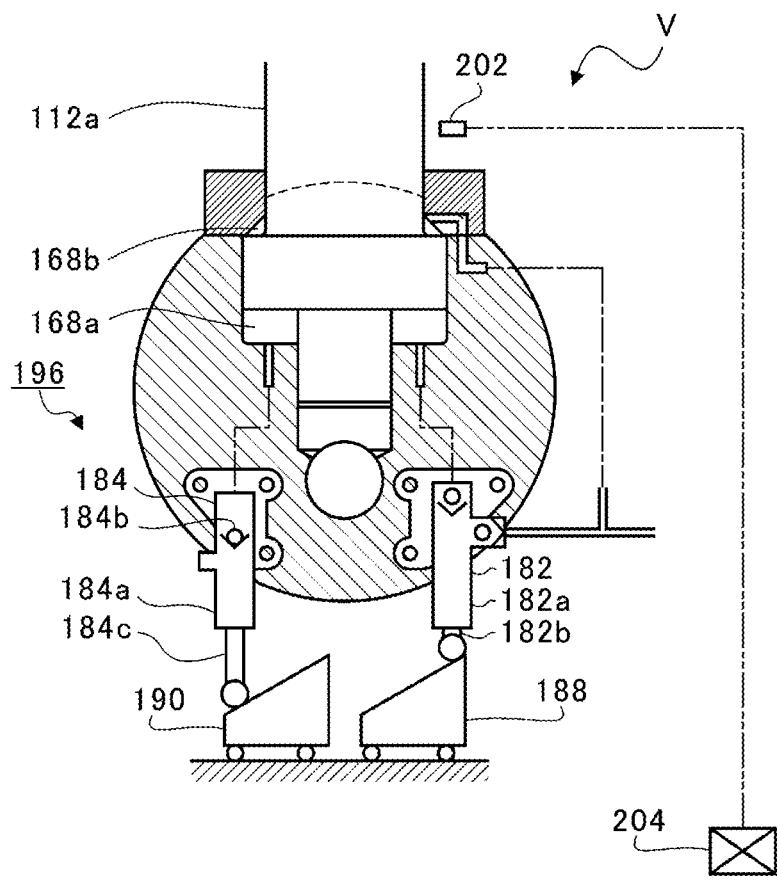
FIG. 8C is an explanatory view for illustrating operation of the compression ratio varying mechanism when the working oil is supplied to the first hydraulic chamber.
Figure 8D:
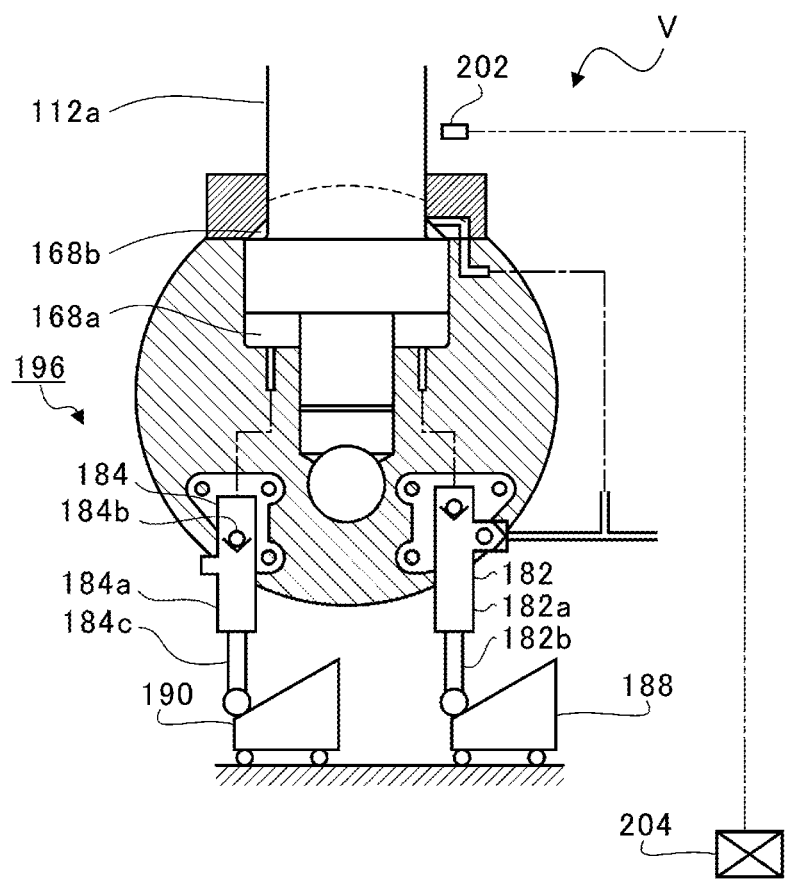
FIG. 8D is an explanatory view for illustrating operation of the compression ratio varying mechanism when the supply of the working oil to the first hydraulic chamber is stopped.

FIG. 8A is an explanatory view for illustrating operation of the compression ratio varying mechanism V when the working oil is discharged from the first hydraulic chamber 168a. FIG. 8B is an explanatory view for illustrating operation of the compression ratio varying mechanism V when the discharge of the working oil in the first hydraulic chamber 168a is stopped. FIG. 8C is an explanatory view for illustrating operation of the compression ratio varying mechanism V when the working oil is supplied to the first hydraulic chamber 168a. FIG. 8D is an explanatory view for illustrating operation of the compression ratio varying mechanism V when the supply of the working oil to the first hydraulic chamber 168a is stopped.

In FIG. 8A, the relative position of the second cam plate 190 is adjusted so that the contact position between the rod 184c and the second cam plate 190 is a relatively high position. Therefore, the rod 184c is deeply pushed into the main body 184a of the spill valve 184 at a crank angle close to the bottom dead center. The rod 184c moves the valve body 184b, and the working oil is discharged from the first hydraulic chamber 168a. In this state, the hydraulic pressure of the hydraulic pump P is acting on the second hydraulic chamber 168b, and the relative position between the piston rod 112a and the crosshead pin 114a are thus stably maintained.

In this state, the top dead center of the piston 112 is lowered (close to the crosshead pin 114a side). That is, the compression ratio of the uniflow scavenging two-cycle engine 100 is low.

When the hydraulic pressure controller 204 receives an instruction to increase the compression ratio of the uniflow scavenging type two-cycle engine 100 from a host controller such as an engine controlling unit (ECU), as illustrated in FIG. 8B, the hydraulic pressure controller 204 moves the second cam plate 190 toward a right side of FIG. 8B. As a result, the contact position between the rod 184c and the second cam plate 190 is lowered. The rod 184c is no longer pushed into the main body 184a at the crank angle close to the bottom dead center. The spill valve 184 is maintained in the closed state of the valve body 184b regardless of the stroke position of the piston 112. That is, the working oil in the first hydraulic chamber 168a comes not to be discharged.

As illustrated in FIG. 8C, the hydraulic pressure controller 204 moves the first cam plate 188 toward a left side of FIG. 8C. As a result, the contact position between the plunger 182b and the first cam plate 188 is raised. The plunger 182b is pushed into the pump cylinder 182a at a crank angle close to the bottom dead center by a reaction force from the first cam plate 188. At this time, the working oil in the pump cylinder 182a is forced into the first hydraulic chamber 168a.

As illustrated in FIG. 8C, the piston rod 112a is pushed upward by the hydraulic pressure. As illustrated in FIG. 8C, the relative position of the piston rod 112a with respect to the crosshead pin 114a is displaced, thereby raising the top dead center of the piston 122 (moving away the top dead center from the crosshead pin 114a side). That is, the compression ratio of the uniflow scavenging two-cycle engine 100 increases.

The plunger pump 182 forces the working oil stored in the plunger pump 182 into the first hydraulic chamber 168a at every stroke of the piston 112. In this configuration, it is assumed that the maximum volume of the first hydraulic chamber 168a is several times larger than the maximum volume in the plunger pump 182. The hydraulic pressure controller 204 adjusts the amount of the working oil forced into the first hydraulic chamber 168a in accordance with the amount of the operation of the plunger pump 182 corresponding to the number of strokes of the piston 112. The hydraulic pressure controller 204 adjusts the amount of the working oil forced into the first hydraulic chamber 168a, to thereby adjust the amount by which the piston rod 112a to be pushed upward.

When the relative position between the piston rod 112a and the crosshead pin 114a reaches a desired position, the hydraulic pressure controller 204 moves the first cam plate 188 toward a right side of FIG. 8D. As a result, the contact position between the plunger 182b and the first cam plate 188 is lowered. The plunger 182b comes not to be pushed into the pump cylinder 182a at a crank angle close to the bottom dead center. In this state, the plunger pump 182 becomes out of operation, and the operation of forcing the working oil into the first hydraulic chamber 168a is stopped.

As described above, the hydraulic pressure adjustment mechanism 196 adjusts the entry position of the piston rod 112a into the first hydraulic chamber 168a in the stroke direction. The compression ratio varying mechanism V adjusts the hydraulic pressure in the first hydraulic chamber 168a through use of the hydraulic pressure adjustment mechanism 196, to thereby change the relative position between the piston rod 112a and the crosshead 114 in the stroke direction. With this configuration, the compression ratio varying mechanism V adjusts the positions (compression ratio) of the top dead center and the bottom dead center of the piston 112.

Figure 9:
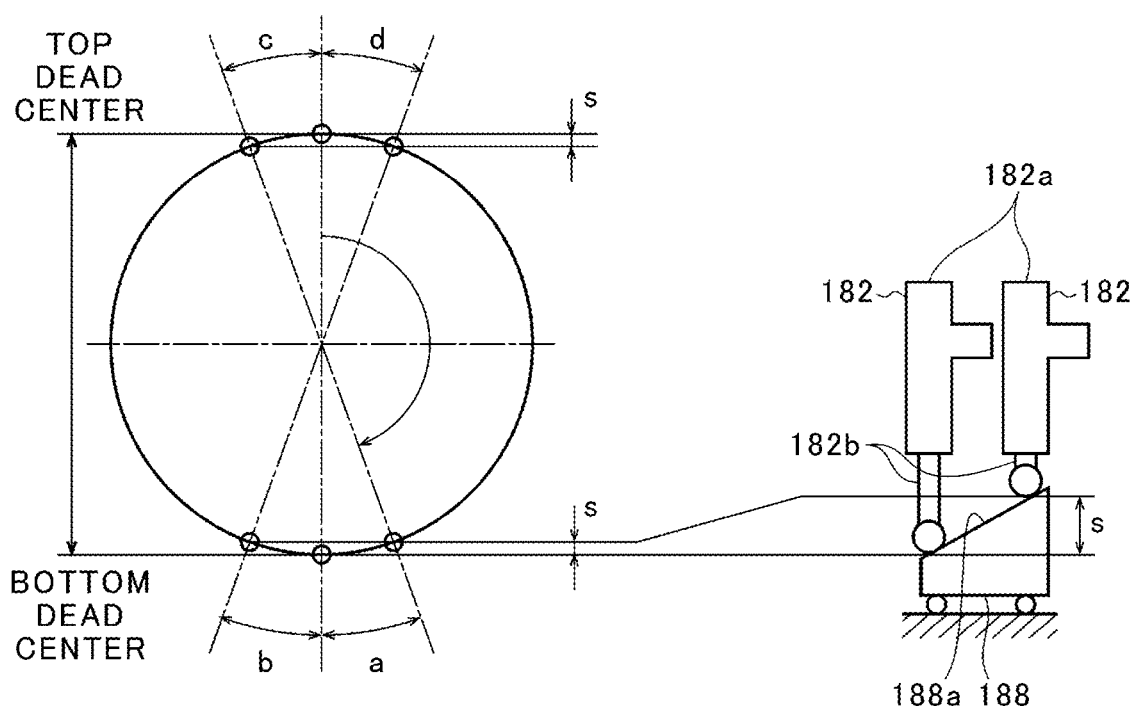
FIG. 9 is an explanatory view for illustrating a crank angle and operation timings of the plunger pump and the spill valve.

FIG. 9 is an explanatory view for illustrating the crank angle and operation timings of the plunger pump 182 and the spill valve 184. In FIG. 9, two plunger pumps 182 different in contact position between the first cam plate 188 and the inclined surface 188a are illustrated side by side for the convenience of description. However, the number of the plunger pumps 182 is actually one, and the contact position with the plunger pump 182 is displaced through the movement of the first cam plate 188. Moreover, the spill valve 184 and the second cam plate 190 are not illustrated.

As illustrated in FIG. 9, a range of the crank angle from an angle before the bottom dead center to the bottom dead center is set to an angle "a", and a range of the crank angle of a phase angle equal to the magnitude of the angle "a" from the bottom dead center is set to an angle "b". Moreover, a range of the crank angle from an angle before the top dead center to the top dead center is set to an angle "c", and a range of the crank angle of a phase angle equal to the magnitude of the angle "c" from the top dead center is set to an angle "d".

When the relative position between the plunger pump 182 and the first cam plate 188 is in the state indicated by the plunger pump 182 illustrated on the right side of FIG. 9, the plunger 182b starts the contact with the inclined surface 188a of the first cam plate 188 at the start position at which the crank angle is the angle "a". The contact of the plunger 182b with the inclined surface 188a is released at an end position at which the crank angle is the angle "b" after the bottom dead center. In FIG. 9, a stroke width of the plunger pump 182 is indicated by a width "s".

Further, when the relative position between the plunger pump 182 and the first cam plate 188 is in the state indicated by the plunger pump 182 illustrated on the left side of FIG. 9, the plunger 182b of the plunger pump 182 comes in contact under a state in which the crank angle is at the bottom dead center. However, the plunger 182b separates immediately without being pushed into the pump cylinder 182a.

In such a manner, the plunger pump 182 operates in the ranges in which the crank angle is within the angle "a" and the angle "b". Specifically, when the crank angle is in the range of the angle "a", the plunger pump 182 forces the working oil into the first hydraulic chamber 168a. Moreover, when the crank angle is in the range of the angle "b", the plunger pump 182 sucks the working oil.

Further, the spill valve 184 operates in the ranges in which the crank angle is within the angle "a" and the angle "b". Specifically, the spill valve 184 discharges the working oil from the first hydraulic chamber 168a when the crank angle is in the range from the start position of the angle "a" to the end position of the angle "b".

A description has been given of the case in which the plunger pump 182 and the spill valve 184 operate in the ranges in which the crank angle is within the angle "a" and the angle "b". However, the plunger pump 182 and the spill valve 184 may operate in the ranges in which the crank angle is within the angle "c" and the angle "d". In this case, when the crank angle is in the range of the angle "c", the plunger pump 182 forces the working oil into the first hydraulic chamber 168a. Moreover, when the crank angle is in the range of the angle "d", the plunger pump 182 sucks the working oil. Further, the spill valve 184 discharges the working oil from the first hydraulic chamber 168a when the crank angle is in the range from the start position of the angle "c" to the end position of the angle "d".

The plunger pump 182 and the spill valve 184 can be operated in a stroke range other than those of the top dead center and the bottom dead center. In this case, the drive mechanism D needs to be moved in synchronization with the reciprocations of the plunger pump 182 and the spill valve 184. However, when the plunger pump 182 and the spill valve 184 are operated in the vicinity of the top dead center or the bottom dead center as in this embodiment, such a synchronizing mechanism does not need to be provided, thereby being capable of reducing a cost.

The pressure in the cylinder 110 is lower in the angle ranges (the angle "a" and the angle "b") of the crank angle on both sides of the bottom dead center than that in the angle ranges (the angle "c" and the angle "d") of the crank angle on both sides of the top dead center. With this configuration, the operation of forcing the working oil from the plunger pump 182 into the first hydraulic chamber 168a is easier in the angle ranges of the crank angle on both sides of the bottom dead center than in the angle ranges of the crank angle on both sides of the top dead center.

The hydraulic pressure of the working oil discharged from the spill valve 184 is lower in the angle ranges (the angle "a" and the angle "b") on both sides of the bottom dead center than that in the angle ranges (the angle "c" and the angle "d") on both sides of the top dead center. With this configuration, an occurrence of cavitation is suppressed more, and a load that operates the spill valve 184 can be suppressed to lower in the angle ranges of the crank angle on both sides of the bottom dead center than in the angle ranges of the crank angle on both sides of the top dead center.

According to the compression ratio varying mechanism V of this embodiment, the communication hole 172b is formed at such a position that the first opening 172b1 and the second opening 172b2 are apart from each other in the stroke direction of the piston 112 without overlapping each other in the radial direction of the piston rod 112a. As a result, the stress concentration that occurs in the communication hole 172b can be reduced.

The embodiment according to the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the above-mentioned embodiment, description has been given of the case in which, in the compression ratio varying mechanism V, the hydraulic chamber is formed between the stepped surface of the piston rod 112a and the stepped surface of the crosshead pin 114a. However, the hydraulic chamber may be formed between the piston 112 and the piston rod 112a.

Moreover, description has been given of the example in which the communication hole 172b is inclined toward the second small-diameter portion 162c side (toward the upward direction of FIG. 4). However, the configuration is not limited to this example, and the communication holes 172b may be inclined toward the first small-diameter portion 162b side (toward the downward direction of FIG. 4).

Further, description has been given of the example in which the communication hole 172b are used for the cooling oil supply of supplying the cooling oil. However, the configuration is not limited to this example, and the communication holes 172b may be used for cooling oil discharge of discharging the cooling oil.

Still further, description has been given of the example in which the communication hole 172b is used for the cooling oil flow-through of causing the cooling oil to flow through. However, the configuration is not limited to this example, and the communication hole 172b may be used for working oil flow-through of causing the working oil to flow through. For example, when a hydraulic chamber is formed between the piston 112 and the piston rod 112a, the communication hole 172b may cause the working oil to flow through to the hydraulic chamber between the piston 112 and the piston rod 112a.

Yet further, description has been given of the case in which the inner diameter of the communication hole 172b is constant. However, the configuration is not limited to this example, and the inner diameter of the communication hole 172b is not required to be constant. For example, in each communication hole 172b, an inner diameter of the first opening 172b1 may be larger than an inner diameter of the second opening 172b2.

INDUSTRIAL APPLICABILITY

The present disclosure can be applied to a compression ratio varying mechanism.

What is claimed is:

1. A compression ratio varying mechanism, comprising:
    a piston;
    a piston rod coupled to the piston;
    an oil passage, which is formed inside the piston rod, and extends in a stroke direction of the piston;
    a communication hole including:
        a first opening opened in an outer peripheral side surface of the piston rod; and
        a second opening, which is offset from the first opening in the stroke direction so as to be prevented from being opposed to the first opening in a radial direction of the piston rod, and is connected to the oil passage at a position apart from the first opening in the stroke direction; and
    a pair of seal members, which are arranged on the outer peripheral side surface of the piston rod, and are apart from each other in the stroke direction,
    wherein any one of the pair of seal members is arranged between the first opening and the second opening in the stroke direction, and
    the second opening is arranged outside a region between the pair of seal members in the stroke direction.

2. The compression ratio varying mechanism according to claim 1, further comprising:
    a large-diameter portion, which is formed in the piston rod, and has the first opening opened therein;
    a small-diameter portion, which is formed in the piston rod, and has an outer diameter smaller than an outer diameter of the large-diameter portion; and
    a curved surface portion, which is formed at a position apart from the second opening in the stroke direction, and connects an outer peripheral surface of the large-diameter portion and an outer peripheral surface of the small-diameter portion to each other.

3. The compression ratio varying mechanism according to claim 2,
    wherein the communication hole comprises a plurality of communication holes arranged in a circumferential direction of the piston rod, and
    wherein at least one of a plurality of first openings of the plurality of communication holes is arranged at a position different in the stroke direction from that of another first opening of the plurality of first openings.

4. The compression ratio varying mechanism according to claim 3,
    wherein at least one of a plurality of second openings of the plurality of communication holes is arranged at a position different in the stroke direction from that of another second opening of the plurality of second openings.

5. The compression ratio varying mechanism according to claim 2,
    wherein the communication hole comprises a plurality of communication holes arranged in a circumferential direction of the piston rod, and
    wherein at least one of a plurality of second openings of the plurality of communication holes is arranged at a position different in the stroke direction from that of another second opening of the plurality of second openings.

6. The compression ratio varying mechanism according to claim 1,
    wherein the communication hole comprises a plurality of communication holes arranged in a circumferential direction of the piston rod, and
    wherein at least one of a plurality of first openings of the plurality of communication holes is arranged at a position different in the stroke direction from that of another first opening of the plurality of first openings.

7. The compression ratio varying mechanism according to claim 6,
    wherein at least one of a plurality of second openings of the plurality of communication holes is arranged at a position different in the stroke direction from that of another second opening of the plurality of second openings.

8. The compression ratio varying mechanism according to claim 1,
    wherein the communication hole comprises a plurality of communication holes arranged in a circumferential direction of the piston rod, and
    wherein at least one of a plurality of second openings of the plurality of communication holes is arranged at a position different in the stroke direction from that of another second opening of the plurality of second openings.

* * * * *